United States Patent
Heyde et al.

(10) Patent No.: US 9,948,103 B2
(45) Date of Patent: Apr. 17, 2018

(54) METHOD FOR THE COMPUTER-AIDED CONTROL OF THE POWER IN AN ELECTRICAL GRID

(71) Applicant: SIEMENS AKTIENGESELLSCHAFT, München (DE)

(72) Inventors: Chris Oliver Heyde, Erlangen (DE); Ulrich Münz, München (DE); Rudolf Sollacher, Eching (DE)

(73) Assignee: SIEMENS AKTIENGESELLSCHAFT (DE)

( * ) Notice: Subject to any disclaimer, the term of this patent is extended or adjusted under 35 U.S.C. 154(b) by 364 days.

(21) Appl. No.: 14/442,421

(22) PCT Filed: Nov. 8, 2013

(86) PCT No.: PCT/EP2013/073409
§ 371 (c)(1),
(2) Date: May 13, 2015

(87) PCT Pub. No.: WO2014/076011
PCT Pub. Date: May 22, 2014

(65) Prior Publication Data
US 2016/0276835 A1    Sep. 22, 2016

(30) Foreign Application Priority Data

Nov. 15, 2012  (DE) .................. 10 2012 220 902
Oct. 25, 2013  (DE) .................. 10 2013 221 750

(51) Int. Cl.
*G05D 3/12*      (2006.01)
*H02J 3/24*      (2006.01)
(Continued)

(52) U.S. Cl.
CPC .............. *H02J 3/24* (2013.01); *G05B 13/041* (2013.01); *G06F 17/11* (2013.01)

(58) Field of Classification Search
CPC ........................................................ H02J 3/14
(Continued)

(56) References Cited

U.S. PATENT DOCUMENTS 7,274,975 B2 *   9/2007  Miller ................... G06Q 50/06
                                                          700/295
7,519,506 B2 *   4/2009  Trias ........................ H02J 3/00
                                                          700/286
(Continued)

FOREIGN PATENT DOCUMENTS

CN    101719669 A    6/2010
CN    101917003 A    12/2010
(Continued)

OTHER PUBLICATIONS

E. Barklund et al.; "Energy Management in Autonomous Microgrid Using Stability-Constrained Droop Control of Inverters"; IEEE Transactions on Power Electronics; vol. 23, No. 5; pp. '; Doi: 10.1109/TPEL.2008.2001910; 2008.

(Continued)

*Primary Examiner* — Suresh Suryawanshi
(74) *Attorney, Agent, or Firm* — Schmeiser Olsen & Watts LLP

(57) ABSTRACT

A method for computer-aided control of power in an electrical grid is provided. The electrical grid has a redetermined rated frequency and includes network nodes that are interconnected via power supply lines, each of the nodes supplying power to or drawing power from the electrical grid. At least part of the nodes are provided with proportional controllers, for which a reference power and/or a proportionality factor is set, and which control the power that is (Continued)

supplied or drawn by each network node based on the difference between the frequency of the voltage in each network node and the rated frequency of the electrical grid. The reference power and the proportionality factor of at least some of the proportional controllers are determined on the basis of solving an optimization problem. The stability and robustness of the operation of the electrical grid is optimized without the need for carrying out complex simulations.

22 Claims, 1 Drawing Sheet

(51) Int. Cl.
*G05B 13/04* (2006.01)
*G06F 17/11* (2006.01)

(58) Field of Classification Search
USPC .......................................................... 700/295
See application file for complete search history.

(56) References Cited

U.S. PATENT DOCUMENTS

| | | | | |
|---|---|---|---|---|
| 8,981,583 | B2* | 3/2015 | Juretzek | F01K 23/10 290/40 B |
| 9,099,893 | B2* | 8/2015 | Schmiegel | H02J 3/383 |
| 9,361,655 | B2* | 6/2016 | Eger | G06Q 30/04 |
| 2010/0138070 | A1* | 6/2010 | Beaudoin | F03D 7/0284 700/297 |
| 2012/0316689 | A1* | 12/2012 | Boardman | H02J 13/0079 700/292 |
| 2014/0327304 | A1* | 11/2014 | Markowz | H02J 3/00 307/11 |
| 2015/0001944 | A1* | 1/2015 | Markowz | H02J 3/32 307/66 |
| 2015/0254787 | A1* | 9/2015 | Eger | G06Q 50/06 700/291 |

FOREIGN PATENT DOCUMENTS

| | | |
|---|---|---|
| CN | 102308451 A | 1/2012 |
| EP | 1324457 A2 | 7/2003 |
| EP | 2683077 A1 | 1/2014 |
| WO | WO 2012037989 A2 | 3/2012 |

OTHER PUBLICATIONS

ENTSO-E European Network of Transmission System Operators for Electricity (Hrsg.): Continental Europe Operation Handbook (UCTE Operation Handbook (OH)); A 1—Appendix 1: Load-Frequency Control and Performance [E], Version v1 .9 draft, Jun. 16, 2004; https://www.entsoe.eu/fileadmin/use_upload/_library/publications/entsoe/Operation_Handbook/Policy_1_Appendix%20_final.pdf [abgerufen am Jun. 15, 2016] P1—Policy 1 : Load-Frequency Control and Performance [C], Version v3.0 ref15; Apr. 1, 2009.

Kerin U. et al: "Faster than Real Time: Dynamic Security Assessment for Foresighted Control Actions"; 2009 IEEE Bucharest Power Tech Conference; Jun. 28-Jul. 2 Bucharest/Romania; DOI: 10.1109/PTC.2009.5282087; pp. 1-7.

Dörfler F. et al: Synchronization in Complex Oscillator Networks and Smart Grids, pp. 1-20; XP007922657; http://arxiv.org/pdf/1208.0045v1.pdf; Jul. 31, 2012.

Hoballah A. et al: Dynamic Stability and Network Constrained Optimal Spinning Reserve Allocation, Proc. IEEE Power and Energy Soc. General Meeting, 2011, pp. 1-5.

Sauer P. W. et al: Power System Dynamics and Stability, Stipes Publishing LLC, 2006, p. 206.

Simpson-Porco J. W. et al: Droop-Controlled Inverters are Kuramoto Oscillators, https://arxiv.org/pdf/1206.5033v1.pdf, 2012.

International Search Report for PCT Application No. PCT/EP2013/073409, dated May 14, 2014.

* cited by examiner

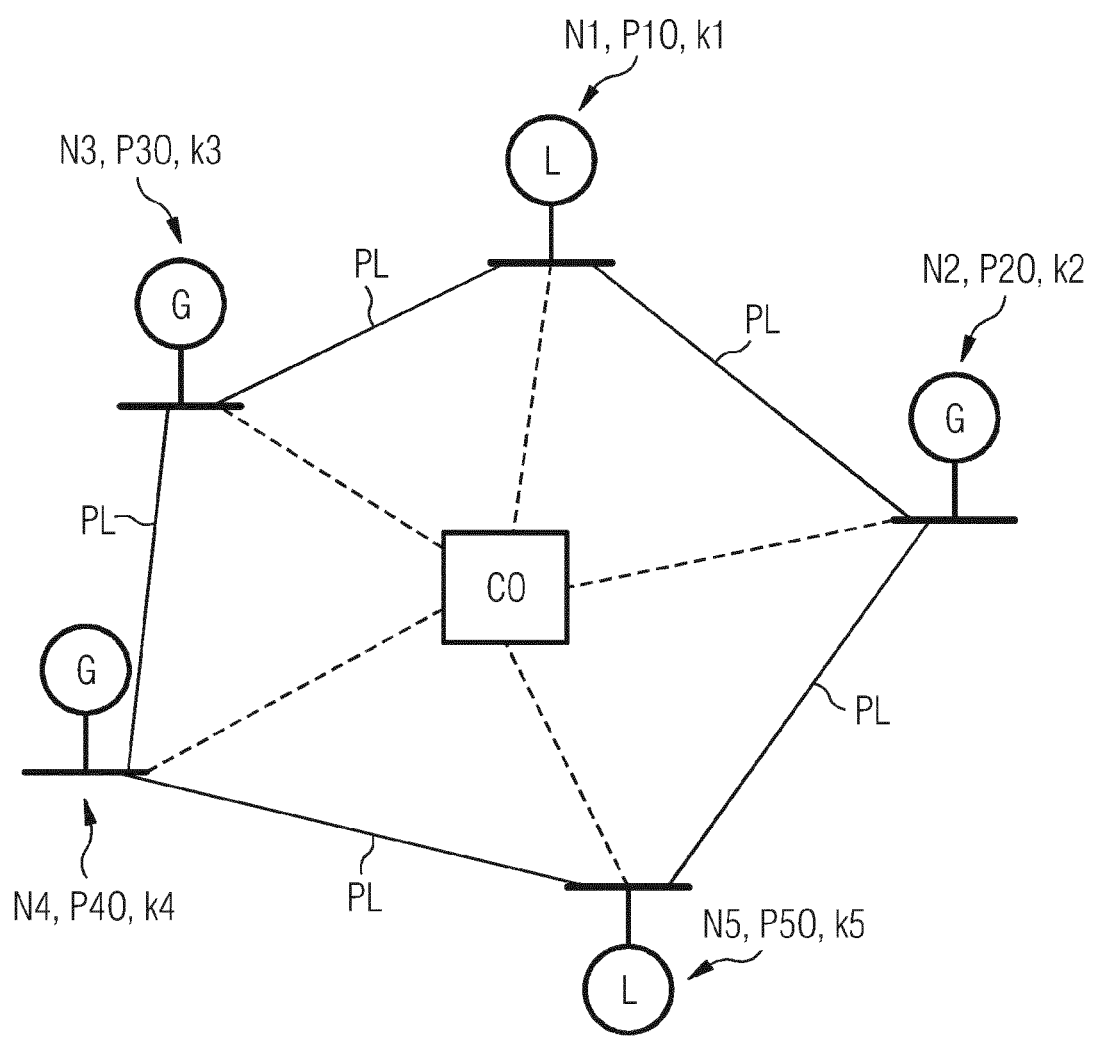

METHOD FOR THE COMPUTER-AIDED CONTROL OF THE POWER IN AN ELECTRICAL GRID

CROSS-REFERENCE TO RELATED APPLICATIONS

This application claims priority to PCT Application No. PCT/EP2013/073409, having a filing date of Nov. 8, 2013, based off of German Application Number DE 102013221750, having a filing date of Oct. 25, 2013 and German Application Number DE 102012220902.6, having a filing date of Nov. 15, 2012, the entire contents of which are hereby incorporated by reference.

FIELD OF TECHNOLOGY

The following relates to a method for computer-aided control of the electrical power in an electrical grid and to a corresponding apparatus. Here and below power is understood to mean real power.

BACKGROUND

An electrical grid comprises a multiplicity of nodes, which are connected to one another via electrical lines and which feed electrical power into the electrical grid or draw electrical power from the electrical grid. For stable operation of an electrical grid, in this case quick balancing between fed electrical power and drawn electrical power is required. For this purpose, proportional controllers which set the fed or drawn power depending on the difference between the frequency of the voltage in the respective node and the rated frequency of the electrical grid are used in corresponding nodes. For stable operation of the electrical grid, in this case a proportionality factor and a reference power suitable for the respective proportional controller need to be established. Usually, heuristic approaches for establishing these parameters are used. Then, the grid is analyzed on the basis of complex simulations for stability and robustness and possibly the parameters are re-established.

In document [1], the stability of an electrical grid is investigated taking into consideration the parameters of proportional controllers without there being any description of how the parameters can be set optimally in relation to the stability of the electrical grid. Instead, a fixed ratio between the proportionality factor and the reference power for all generating units in the electrical grid is proposed.

Document [2] describes how the primary control power in an electrical grid can be distributed optimally between the nodes. The primary control power of each node is directly dependent on the proportionality factors of the nodes. For this optimization, the stability reserve of the electrical grid is estimated on the basis of neural networks. In this method, the stability represents a secondary condition and is not used for optimization of the electrical grid.

SUMMARY

An aspect relates to a simple and efficient method for computer-aided control of the power in an electrical grid which ensures stable operation of the electrical grid.

The method according to embodiments of the invention is used for controlling an electrical grid and in particular a high-voltage grid or a medium-voltage grid. The electrical grid has a preset rated frequency (for example 50 Hz or 60 Hz), which can also be set variably, if appropriate, and comprises a plurality of nodes, which are connected to one another via electrical lines and which each feed power into the electrical grid or draw power from the electrical grid. In this case, both nodes which feed power and nodes which draw power are provided. A node can comprise an electrical generator, for example on the basis of fossil fuels or regenerative energies, for power generation. Likewise, a node can include an electric motor. The nodes can possibly also comprise transformers, rectifiers or the like. In particular, a plurality of components for energy generation and/or energy withdrawal can also be combined in one node.

In the electrical grid, the fed or drawn power of the respective node is provided via a proportionality relationship, in accordance with which, in a preset frequency range of the voltages in the respective node (i.e. in particular in a range without a saturation behavior), the power is set on the basis of a reference power, which is the drawn or fed power at the rated frequency, and a proportionality factor depending on the difference between the frequency of the voltage in the respective node and the rated frequency of the electrical grid. The term frequency should in this case be understood broadly and in particular also includes an angular frequency. A proportional controller is provided in at least some of the nodes, for which proportional controller the reference power and/or the proportionality factor can be set.

In the method according to embodiments of the invention, in a step a), a steady state of the electrical grid is modeled. In this steady state, a constant frequency for all voltages of the nodes is set, wherein this frequency can deviate from the rated frequency of the grid.

In a step b) of the method according to embodiments of the invention, an optimization problem is solved and hereby reference powers and proportionality factors for at least some of the proportional controllers are determined. The optimization problem is in this case defined on the basis of a condition for the modeled steady state of the electrical grid, wherein, when the condition is met, the phase differences between the voltages of adjacent nodes (i.e. between nodes which are connected to one another without any further nodes interposed) are in each case less than or less than or equal to a maximum phase value. Then, in a step c), the at least some of the proportional controllers are set to the reference powers and proportionality factors determined in step b).

The method according to embodiments of the invention makes use of the knowledge that there is a condition for the steady state of the grid which takes into consideration the phase difference between the voltages of adjacent nodes. In this case, a phase difference which is as small as possible results in low loading of the electrical lines between the nodes and therefore in very stable and robust operation of the electrical grid. The optimization problem according to embodiments of the invention can in this case be solved easily and efficiently using numerical methods without complex simulations of the electrical grid needing to be implemented for this purpose.

Steps a) to c) of the method according to embodiments of the invention can be implemented again and again depending on specific criteria in order to thus ensure optimum operation of the electrical grid given changing parameters of the grid. For example, steps a) to c) can be implemented whenever the line frequency set in the electrical grid deviates from the rated frequency of the electrical grid by more than a predetermined degree. Accordingly, the grid can be optimized continuously in respect of robustness and stability.

In a particularly preferred embodiment, the abovementioned proportionality relationship in the respective nodes is as follows:

$$\tilde{p}_i = \tilde{p}_{i0} - k_{\theta i}(\dot{\tilde{\theta}}_i - \omega_0),$$

wherein $\tilde{p}_i$ is the power fed or drawn by a respective node i;
wherein $\tilde{p}_{i0}$ is the sum of the reference power $p_{i0}$ and the local load $p_u$ in the node i, wherein $p_u$ always has a positive mathematical sign;
wherein $k_{\theta i}$ is the proportionality factor in the node i;
wherein $\dot{\tilde{\theta}}_i$ is the frequency of the voltage of the node i;
wherein $\omega_0$ is the rated frequency of the electrical grid.

In this case, a fed power has a positive mathematical sign and a drawn power has a negative mathematical sign.

In a preferred embodiment of the method according to the invention, the steady state of the electrical grid is modeled on the basis of a dynamic physical model, wherein the dynamic physical model describes the time profile of the phases of the voltages in the respective nodes as a function of parameters of the electrical grid comprising the reference powers and proportionality factors of the proportionality relationships. Preferably, the dynamic physical model comprises a system of coupled differential equations, wherein a respective differential equation represents the time profile of the phase of the voltage of a node. The system of coupled differential equations is in this case in particular a physical oscillation equation system. The oscillation equation system is preferably based on the model described in document [3] (see equations (7.201) and (7.202) therein).

In a particularly preferred embodiment, the oscillation equation system used in the method according to embodiments of the invention are as follows:

$$M_i \ddot{\tilde{\theta}}_i + k_{\theta i} \dot{\tilde{\theta}}_i = k_{\theta i} \omega_0 + \tilde{p}_{i0} - p_{iL} - \Sigma_{j \in N_i} b_{ij} u_i u_j \sin(\tilde{\theta}_i - \tilde{\theta}_j),$$

where $M_i$ is the moment of inertia of a mass, for example a synchronous machine, coupled to the electrical grid in the respective node i;
where $\ddot{\tilde{\theta}}_i$ is the derivative of the frequency of the voltage in the respective node i;
where $\tilde{\theta}_i$ and $\tilde{\theta}_j$ are the phase of the voltage in the respective node i and j, respectively;
where $N_i$ represents the amount of nodes adjacent to a respective node i (i.e. nodes connected to the node i directly via an electrical line without further nodes interposed);
where $u_i$ and $u_j$ are the rms values of the voltages in the respective nodes i and j, respectively;
where $b_{ij}$ is the susceptance of the electrical line between nodes i and j.

The above moment of inertia $M_i$ can possibly also have the value zero, for example if the mass is decoupled from the electrical grid via a converter, as is the case, for example, in wind turbines comprising full converters.

In a further embodiment of the method according to the invention, the modeling of the steady state of the electrical grid is based on load flow equations (known per se) for the real powers generated and consumed in the respective nodes. If appropriate, the condition whereby the ohmic resistance on the electrical lines between adjacent nodes (i.e. nodes connected directly to one another via an electrical line without any further nodes interposed) is negligibly low in comparison with the reactance on the electrical lines between adjacent nodes can be taken into consideration in the load flow equations. As set forth in the detailed description, this modeling can correspond to modeling on the basis of a dynamic physical model.

In the modeling by means of load flow equations, the load flow equation for a respective node i is preferably as follows:

$$P_i = \sum_{j \in N_i} \left[ u_i^2 \frac{r_{ij}}{r_{ij}^2 + x_{ij}^2} - \frac{u_i u_j}{r_{ij}^2 + x_{ij}^2} (r_{ij} \cos(\tilde{\theta}_j - \tilde{\theta}_i) + x_{ij} \sin(\tilde{\theta}_j - \tilde{\theta}_i)) \right],$$

where $P_i$ is the real power generated at the node i;
where $\tilde{\theta}_i$ and $\tilde{\theta}_j$ are the phase of the voltage in the respective nodes i and j;
where $N_i$ represents the amount of nodes adjacent to a respective node i (i.e. nodes connected directly to the node i via an electrical line without any further nodes interposed);
where $u_i$ and $u_j$ are the rms values of the voltages in the respective nodes i and j;
where $r_{ij}$ is the ohmic resistance and $x_{ij}$ is the reactance of the electrical line between nodes i and j.

In a further, particularly preferred embodiment, the condition for the modeled steady state, via which the optimization problem is solved, is as follows:

$$\|B^T L^\dagger \omega\|_\infty \leq \sin(\gamma) \, \gamma \in \left[0, \frac{\pi}{2}\right],$$

where $L^\dagger$ is the pseudo-inverse of the matrix $L = B \mathrm{diag}(a_{ij}) B^T$,
where $a_{ij} = b_{ij} u_i u_j$;
where $u_i$ and $u_j$ are the rms values of the voltages in the respective nodes i and j;
where $b_{ij}$ is the susceptance of the electrical line between nodes i and j;
where $B^T$ is the incidence matrix of the topology of the electrical grid;
where $\omega = \mathrm{vec}(\omega_i)$, where $$\omega_i = p_{i0} - k_{\theta i} \frac{\sum_{i=0}^{N} p_{i0}}{\sum_{i=0}^{N} k_{\theta i}},$$

and N represents the number of the nodes in the electrical grid;
where $p_{i0} = \tilde{p}_{i0} - p_{iL}$;
where $\gamma$ represents the maximum phase value,
where the optimization problem is the minimization of $\|B^T L^\dagger \omega\|_\infty$ as a function of the reference powers and proportionality factors of the at least some of the proportional controllers.

The above condition in this case corresponds to the condition derived in document [4], wherein $\omega_i$ is assumed as given therein and is not dependent on $p_{i0}$ and $k_{\theta i}$.

In a further, particularly preferred embodiment, the optimization problem, in order to solve this problem, is converted into a convex optimization problem. A convex optimization problem is characterized by the fact that the corresponding minimum, i.e. the minimum of the maximum phase value, is a global minimum. Such an optimization problem can be solved particularly easily and efficiently using methods known per se, such as, for example, the inner point method.

In a further configuration of the method according to embodiments of the invention, during the solution of the optimization problem, it is considered, as boundary condition, that the reference powers of at least some of the proportional controllers are within a predetermined interval.

Alternatively or in addition, the boundary condition whereby the reference powers of the proportionality relationships of all of the nodes fluctuate within a predetermined fluctuation degree is additionally taken into consideration. In this way, uncertainties relating to the power generation or the load in the grid can be taken into consideration in a suitable manner.

In one variant of the method according to embodiments of the invention, the fluctuation degree is defined in such a way that the fluctuation in the reference power of the proportionality relationship of each node is less than or less than or equal to a predetermined value. Alternatively or in addition, however, the fluctuation degree can also be defined in such a way that a sum and in particular a weighted sum of the fluctuations in the reference powers of the proportionality relationships of all of the nodes in the electrical grid is less than or less than or equal to a predetermined value.

In a further configuration of the method according to embodiments of the invention, during the solution of the optimization problem, it is considered, as boundary condition, that the line frequency set in the steady state in the electrical grid deviates from the rated frequency of the electrical grid by less than a predetermined frequency value.

In a further variant, at least some of the nodes have available primary control powers for the electrical grid, wherein, from the above boundary condition, whereby the line frequency set in the steady state in the electrical grid deviates from the rated frequency by less than a predetermined frequency value, a further boundary condition is derived which is taken into consideration in the solution of the optimization problem and in accordance with which the respective primary control powers are less than or less than or equal to a predetermined threshold value.

In a particularly preferred embodiment, the optimization problem of the invention describes the minimization of a cost function, which is greater the greater the maximum phase value is. This cost function can comprise, as single term, the maximum phase value. The optimization problem then describes the minimization of the maximum phase value. Likewise, the cost function can comprise a sum of a term of the maximum phase value and one or more further terms, wherein the further term(s) is/are preferably configured in such a way that at least one of the further terms is greater the greater the power fed by the nodes and/or the lower the power drawn by the nodes and/or the greater the primary control power that the nodes have available.

If appropriate, the optimization problem can also describe the minimization of a cost function which is independent of the maximum phase value, wherein, as boundary condition of the optimization problem, it is considered that the maximum phase value is less than a preset threshold value (in particular less than $\pi/4$).

The boundary conditions and extensions described above enable suitable matching of the optimization problem to corresponding circumstances in the electrical grid. In this case, one or more of the boundary conditions and possibly also all of the boundary conditions can be included in the solution of the optimization problem.

In a further embodiment of the method according to the invention, step b) is implemented a plurality of times for ever smaller predetermined frequency values, i.e. step b) is repeated for boundary conditions on the basis of different maximum deviations between the line frequency and the rated frequency. Step b) is in this case repeated until the minimized maximum value resulting from the solution of the optimization problem exceeds a predetermined threshold, wherein the at least some of the proportional controllers is set to the reference powers and proportionality factors which result from step b) directly prior to the predetermined threshold being exceeded. In this way, the optimization problem of embodiments of the invention can be combined in a suitable manner with the criterion of a small deviation between the line frequency and the rated frequency.

In addition to the above-described method, embodiments of the invention also relates to an apparatus for computer-aided control of the power in an electrical grid, wherein the apparatus has one or more means for implementing the method according to embodiments of the invention or one or more variants of the method according to embodiments of the invention.

In addition, embodiments of the invention relates to an electrical grid, which comprises the above-described apparatus according to the invention for controlling the power generated in the electrical grid.

BRIEF DESCRIPTION

Some of the embodiments will be described in detail, with reference to the following figures, wherein like designations denote like members, wherein:

FIG. 1 schematically depicts a detail of an embodiment of an electrical grid in accordance with an embodiment of the method disclosed herein.

DETAILED DESCRIPTION

Exemplary embodiments of the invention will be described in detail below with reference to FIG. 1 attached. This FIGURE shows schematically a detail of an electrical grid in which one embodiment of the method according to the invention is implemented.

The electrical grid illustrated schematically in FIG. 1 is a transmission grid in the form of a high-voltage grid, for example with high voltages of 110 kV, 220 kV or 380 kV. However, the invention is not restricted to high-voltage grids and can possibly also be used for electrical distribution grids in the form of medium-voltage and low-voltage grids. The detail of the electrical grid indicated in FIG. 1 comprises a plurality of nodes N1, N2, N3, N4 and N5, which are connected to one another via (purely inductive) electrical lines PL, wherein the electrical grid as a whole contains a substantially greater number of nodes. The nodes can represent sources, via which electrical power is fed into the electrical grid, or sinks, via which power is drawn from the electrical grid. In FIG. 1, sources are denoted by the reference symbol G (G=generator) and sinks are denoted by the reference symbol L (L=load).

The feed of current into the electrical grid takes place, for example, via synchronous generators, inverters or converters. The sources can comprise fossil fuel power plants or else regenerative energy generation plants in the form of wind farms photovoltaic systems or the like, for example. In order to draw electrical power from the electrical grid, asynchronous machines, rectifiers or the like are used, for example. A respective node can also represent a conglomerate of a plurality of sources and sinks, wherein the node represents a source in the case of more power generated than consumed and otherwise represents a sink.

As can be seen from FIG. 1, the nodes N1 and N5 are sinks, whereas the nodes N2, N3 and N4 represent sources. In each of the nodes, a voltage with a predetermined frequency is set, which frequency ideally corresponds to the rated frequency of the electrical grid. This rated frequency is 50 Hz or 60 Hz, for example.

In the embodiment shown in FIG. 1, a central control unit CO is provided in a control center, for example, which monitors all of the nodes of the grid and can communicate therewith via communication lines, which are indicated by dashed lines. With this central control unit, the parameters in the form of the reference powers P10 to P50 (or a subset thereof) and the proportionality factors k1 to k5 (or a subset thereof) are set in a suitable manner by proportional controllers (droop controllers), which are provided in the respective nodes N1 to N5. In this case, the parameters can be selected differently for each node and are denoted below by $\tilde{p}_{i0}$ and $k_{\theta i}$, respectively. The power fed or drawn in the respective node is controlled by the proportional controllers. If appropriate, in this case nodes can also be provided for which the parameters $\tilde{p}_{i0}$ and $k_{\theta i}$ are fixed and are therefore not variable by the control unit CO.

The power $\tilde{p}_i$ fed or drawn in a respective node is represented by the following proportionality relationship:

$$\tilde{p}_i = \tilde{p}_{i0} - k_{\theta i}(\dot{\tilde{\theta}}_i - \omega_0).$$

In this case, $\dot{\tilde{\theta}}_i$ denotes the respective frequency of the voltage in the corresponding node $i \in N = \{1, \ldots, N\}$ and $\omega_0 > 0$ represents the rated frequency. The parameters $\tilde{p}_{i0}$ and $k_{\theta i} > 0$ represent the reference power and the proportionality factor (also referred to as gain), respectively. The above proportionality relationship is valid for all nodes, wherein the value $\tilde{p}_i$ is positive for nodes which feed power into the grid and the value $\tilde{p}_i$ is negative for nodes which draw power from the electrical grid.

The aim of the method according to embodiments of the invention now consists in fixing the settable parameters $\tilde{p}_{i0}$; and $k_{\theta i}$ of the corresponding nodes optimally in respect of the stability or robustness of the electrical grid. In order to implement the method according to embodiments of the invention, an optimization problem is solved in computer-aided fashion in the control unit CO, wherein the optimization problem is based on a dynamic physical model, which describes the time profile of the phases of the voltages in the nodes as a function of parameters of the electrical grid. In the embodiment described below, a physical oscillation equation system which consists of a multiplicity of coupled differential equations is used as dynamic physical model, wherein a respective differential equation represents the time profile of the voltage phase of a corresponding node from the electrical grid. This differential equation system is as follows:

$$M_i \ddot{\tilde{\theta}}_i + k_{\theta i} \dot{\tilde{\theta}}_i = k_{\theta i} \omega_0 + \tilde{p}_{i0} - p_{iL} - \sum_{j \in N_i} b_{ij} u_i u_j \sin(\tilde{\theta}_i - \tilde{\theta}_j) \quad (1).$$

In this case, $M_i$ denotes the mechanical moment of inertia of the respective nodes which, in the case of a generator or motor coupled directly to the electrical grid, corresponds to the moment of inertia of this generator or motor. If the coupling of the generator or motor to the electrical grid is performed with a converter interposed, as is the case in wind turbines, for example, this moment of inertia has the value 0. The variable $\tilde{\theta}_i$ represents the phase of the voltage in the corresponding node i. The index j is used to represent the neighbors of the corresponding node i, wherein $N_i$ corresponds to the amount of neighbors of the node i. In addition, $p_u$ denotes the local load in each node i. In this case, insulated passive loads in the electrical grid can also be taken into consideration, if appropriate, by virtue of these loads being distributed among various nodes on the basis of the Kron reduction method known per se. The parameter $b_{ij}$ represents the susceptance of the electrical line between nodes i and j, and $u_i$ and $u_j$ represent the rms values of the voltages in the nodes i and j, respectively. For the purpose of simple notation, the definition $p_\omega = \tilde{p}_{i0} - p_u$ is introduced. $p_{i0}$ in this case corresponds to the power fed in or drawn in a node at the rated frequency within the meaning of claim 1.

In order to formulate the optimization problem, the system is transformed into a rotating coordinate system, which rotates with the line frequency $\Omega$ set in the steady state of the electrical grid. In the steady state, the sum of the power fed into the grid and drawn from the grid is in this case equal to zero, i.e. the following holds true:

$$\Sigma_{i=1}^N \Sigma_{j \in N_i} b_{ij} u_i u_j \sin(\tilde{\theta}^*_i - \tilde{\theta}^*_j) = 0 \quad (2).$$

In this case, $\tilde{\theta}^*_i - \tilde{\theta}^*_j$ denotes the constant difference between the phase $\tilde{\theta}_i$ of the node i and the phase $\tilde{\theta}_j$ of the adjacent node j in the steady state. Using equation (1), the following results from this:

$$\Sigma_{i=1}^N k_{\theta i} \Omega = \Sigma_{i=1}^N (k_{\theta i} \omega_0 + p_{i0}) \quad (3).$$

This in turn results in:

$$\Omega = \omega_0 + \frac{\sum_{i=1}^N p_{i0}}{\sum_{i=1}^N k_{\theta i}}. \quad (4)$$

The transformation into the coordinate system which rotates with the frequency $\Omega$ is as follows:

$$\theta_i = \tilde{\theta}_i - \Omega t,$$

$$\dot{\theta}_i = \dot{\tilde{\theta}}_i - \Omega, \text{ and}$$

$$\ddot{\theta}_i = \ddot{\tilde{\theta}}_i.$$

This gives:

$$M_i \ddot{\theta}_i + k_{\theta i} \dot{\theta}_i = p_{i0} - k_{\theta i} \frac{\sum_{i=1}^N p_{i0}}{\sum_{i=1}^N k_{\theta i}} - \sum_{j \in N_i} b_{ij} u_i u_j \sin(\theta_i - \theta_j), \quad (5)$$

$$M_i \ddot{\theta}_i + k_{\theta i} \dot{\theta}_i = \omega_i(k_\theta, p_0) - \sum_{j \in N_i} a_{ij} \sin(\theta_i - \theta_j). \quad (6)$$

In this case:

$$a_{ij} = b_{ij} u_i u_j \text{ and} \quad (7)$$

$$\omega_i(k_\theta, p_0) = \frac{p_{i0} \sum_{i=1}^N p_{i0}}{\sum_{i=1}^N k_{\theta i}}.$$

The variable $\omega_i(k_\theta, p_0)$ in this case represents the natural frequency and is dependent on the proportionality factors $k_\theta = \text{vec}(k_{\theta i})$ and the reference powers $p_0 = \text{vec}(p_{i0})$. For the purpose of simple notation, often the expression $\omega_i$ is used if the argument $k_\theta, p_0$ is not important. In this case, $\Sigma_{i=1}^N \omega_i (k_\theta, p_0) = 0$ holds true for all $k_\theta$ and $p_0$.

In document [4] already mentioned above, the steady state of the differential equation (6) has been investigated. In this state, $\ddot{\theta}_i = 0$ and $\dot{\theta}_i = 0$ hold true. Thus, the steady state is represented by respective voltage phases $\theta^*_i$, $i \in N$ which satisfy the following condition:

$$0 = \omega_i(k_{\theta_i}, p_0) - \Sigma_{j \in N_i} a_{ij} \sin(\theta^*_i - \theta^*_j) \quad (8).$$

The above equation (8) can be described in compact form as follows:

$$\omega = B \operatorname{diag}(a_{ij}) \sin(B^T \theta^*) \quad (9),$$

where $B^T$ denotes the incidence matrix of the topology of the electrical grid which is known per se, and $\omega = \operatorname{vec}(\omega_i)$ and $\theta^* = \operatorname{vec}(\theta^*_i)$ hold true.

Previously, the steady state of the electrical grid has been described in accordance with the equations (8) and (9) on the basis of a dynamic physical model. Similarly, the steady state can also be modeled by means of load flow equations known per se, as explained below. It is assumed here that the electrical line between two adjacent nodes i and j in the electrical grid is described by the series complex impedance $z_{ij} = r_{ij} + j_m x_{ij}$ and the shunt capacitance $b_{ij}^c$, wherein the latter is divided evenly between the adjacent nodes. $r_{ij}$ is generally referred to as the ohmic resistance (or equivalent resistance) and $x_{ij}$ is referred to as reactance. The variable $j_m$ denotes the complex unit, which is often also merely denoted by j, but in this case is mentioned as $j_m$ for distinguishing from the indices j of the nodes. The complex voltage of the node i is in this case provided by $\underline{u}_i = u_i \exp(j_m \tilde{\theta}_i)$. Similarly, the complex voltage of the node j is provided by $\underline{u}_j = u_j \exp(j_m \tilde{\theta}_j)$. The voltages $u_i$ and $u_j$ and the phases $\tilde{\theta}_i, \tilde{\theta}_j$ have already been defined previously in connection with equation (1). The complex current $\underline{i}_{ij}$ flowing from the node i to the node j results from the above voltages and the impedance, as follows:

$$\underline{i}_{ij} = (\underline{u}_i - \underline{u}_j)/z_{ij} \quad (101).$$

As is known per se, the apparent power $S_{ij}$ that flows from the node i to the node j is given as follows:

$$S_{ij} = P_{ij} + j_m Q_{ij} = \underline{u}_i \underline{i}^*_{ij} \quad (102).$$

In this case, $P_{ij}$ denotes the real power which flows from the node i to the node j. Similarly, $Q_{ij}$ corresponds to the reactive power that flows from the node i to the node j. $\underline{i}^*_{ij}$ is the conjugated complex value of $\underline{i}_{ij}$.

This results in the AC load flow equations for the electrical grid comprising N nodes:

$$S_i = P_i + j_m Q_i = \sum_{j \in N_i} S_{ij} = \sum_{j \in N_i} \left[ \frac{\underline{u}_i(\underline{u}^*_i - \underline{u}^*_j)}{z^*_{ij}} - \frac{\underline{u}_i \underline{u}^*_i j_m b_{ij}}{2} \right] \quad (103)$$

$$P_i = \sum_{j \in N_i} \left[ u_i^2 \frac{r_{ij}}{r_{ij}^2 + x_{ij}^2} - \frac{u_i u_j}{r_{ij}^2 + x_{ij}^2} \left( r_{ij} \cos(\tilde{\theta}_j - \tilde{\theta}_i) + x_{ij} \sin(\tilde{\theta}_j - \tilde{\theta}_i) \right) \right] \quad (104)$$

$$Q_i = \sum_{j \in N_i} \left[ u_i^2 \left( \frac{x_{ij}}{r_{ij}^2 + x_{ij}^2} - \frac{b_{ij}^c}{2} \right) - \frac{u_i u_j}{r_{ij}^2 + x_{ij}^2} \left( x_{ij} \cos(\tilde{\theta}_j - \tilde{\theta}_i) - r_{ij} \sin(\tilde{\theta}_j - \tilde{\theta}_i) \right) \right] \quad (105)$$

In this case, summations are performed over all of the nodes j which are adjacent to the node i. $S_i$ denotes the apparent power generated at the node i, $P_i$ denotes the real power generated at the node i, and $Q_i$ denotes the reactive power generated at the node i. Consumed real and reactive powers are modeled by negative $P_i$ and $Q_i$.

It is further assumed that the equivalent resistance between the nodes i and j is negligibly low in comparison with the reactance between the nodes i and j, i.e. $r_{ij} \ll x_{ij}$. This means that the $I^2R$ losses on the electrical lines can be ignored. By means of this assumption, the following simplified formula results for the real power $P_i$:

$$P_i = -\sum_{j \in N_i} \left( \frac{u_i u_j}{x_{ij}} \sin(\tilde{\theta}_j - \tilde{\theta}_i) \right). \quad (106)$$

Since $r_{ij} \ll x_{ij}$, $b_{ij} = 1/x_{ij}$ holds true.

Therefore, the above equation (106) can also be described as follows:

$$P_i = -\sum_{j \in N_i} \left( b_{ij} u_i u_j \sin(\tilde{\theta}_j - \tilde{\theta}_i) \right). \quad (107)$$

$P_i$ results from the proportionality relationship already mentioned above, as follows:

$$P_i = \tilde{p}_{i0} - \tilde{p}_{iL} = p_{i0} - k_{\theta i}(\dot{\tilde{\theta}}_i - \omega_0). \quad (108)$$

Thus, the following holds true:

$$P_i = p_{i0} - k_{\theta i}(\dot{\tilde{\theta}}_i - \omega_0) = -\sum_{j \in N_i} \left( b_{ij} u_i u_j \sin(\tilde{\theta}_j - \tilde{\theta}_i) \right). \quad (109)$$

In the steady state of the electrical grid, $\dot{\tilde{\theta}}_i$ is equal in value for all of the nodes of the electrical grid, i.e. $\dot{\tilde{\theta}}_i = \Omega$ holds true for all $i \in N$. In addition, in the steady state, the sum of the real power fed into the grid and drawn from the grid is equal to zero, i.e. with the aid of the above equation (109), the following results:

$$\sum_{i=1}^{N} P_i = \sum_{i=1}^{N} \left( p_{i0} - k_{\theta i}(\dot{\tilde{\theta}}_i - \omega_0) \right) = -\sum_{i=1}^{N} \sum_{j \in N_i} \left( b_{ij} u_i u_j \sin(\tilde{\theta}_j - \tilde{\theta}_i) \right) = 0. \quad (110)$$

This corresponds to the above equation (2).

Finally, via the relationship contained in equation (110)

$$\sum_{i=1}^{N} \left( p_{i0} - k_{\theta i}(\dot{\tilde{\theta}}_i - \omega_0) \right) = 0, \quad (111)$$

$\Omega$ is obtained by inserting $\dot{\tilde{\theta}}_i = \Omega$ into this relationship and solving the equation for $\Omega$. This results in the same value for $\Omega$ as in the above equation (4). By inserting this value for $\Omega$ into the above equation (109) for $\dot{\tilde{\theta}}_i$, finally again equation (8) is obtained, which represents the steady state. Accordingly, the modeling of the steady state by virtue of the just-described load flow calculation by means of the above load flow equations results in the same result as the modeling of the steady state by virtue of the above-explained dynamic physical model.

The method is continued on the basis of the above condition in accordance with equation (8) or (9). In document [4], it has been demonstrated that a steady state $\theta^*$ exists, with the result that $|\theta^*_i - \theta^*_j| \leq \gamma$ holds true for all adjacent nodes i, j if the following condition is met:

$$\|B^T L^\dagger \omega\|_\infty \le \sin(\gamma), \gamma \in [0, \frac{\pi}{2}].  \quad (10)$$

$L^\dagger$ represents the pseudoinverse of the Laplace matrix $L=B\mathrm{diag}(a_{ij})B^T$ of the electrical grid. The above equation (10) corresponds to equation (17) from document [4], wherein, in said document, $\omega_t$ is assumed as given and is not dependent on $p_0$ and $k_\theta$.

On the basis of the above condition according to equation (10), the minimum of the infinity norm according to the left-hand part of equation (10) is now sought, which in turn corresponds to the minimization of the maximum phase difference $\gamma$ which can occur on electrical lines between adjacent nodes. As part of the optimization problem, therefore, corresponding parameters $k_{\theta i}$ and $p_{i0}$ are sought so that $\gamma$ becomes small. A small value for $\gamma$ guarantees small phase differences in the steady state, which in turn results in an electrical grid which is robust with respect to load variations.

In the solution of the above-described optimization problem, the fact that not all of the parameters $k_{\theta i}$ and $p_{i0}$ can be set in the grid is taken into consideration. Nodes whose parameters $k_{\theta i}$ and $p_{i0}$ can be manipulated are denoted below by the index set $N_K$ for $k_{\theta i}$ and by the index set $N_p$ for $p_{i0}$, i.e. $k_{\theta i}$, $i \in N_K$ and $p_{i0}$, $i \in N_P$ can be manipulated in the electrical grid. For the purpose of simple notation and without restricting generality, it is assumed that $p_0 = [p_t^T p_n^T]^T$ can be separated into settable parameters $p_t$ and non-settable parameters $p_n$. The permissible sets of settable parameters $k_\theta$ and $p_0$ are therefore as follows:

$$K = \{k_\theta \in \mathbb{R}_+^N : k_{\theta i}^0, \forall i = \overline{N_K} = N \backslash N_K\}  \quad (11),$$

$$P_T = \{p_t \in \mathbb{R}^{|N_P|}\}  \quad (12),$$

where $k_{\theta i}^0 > 0$ and $P_n$ are provided as non-settable parameters and $\mathbb{R}_+^N$ represents an N-dimensional vector with exclusively positive elements. $\mathbb{R}$ in this case denotes the set of real numbers. In order to solve the optimization problem, the following boundary condition is taken into consideration, inter alia:

$$\underline{p_t} \le p_t \le \overline{p_t}  \quad (13),$$

where an upper and lower limit for the reference powers of the corresponding proportional controllers is fixed by $\underline{p_t}, \overline{p_t} \in \mathbb{R}^{|N_P|}$.

In addition, as boundary condition, uncertainties are taken into consideration in the feed or withdrawal of electrical power. These uncertainties are taken into consideration by changes to $p_{i0}$ in equation (1). In this case, it is assumed that all $p_{i0}$ are within a predetermined interval, i.e. that the following holds true:

$$p_0 = \begin{pmatrix} p_t \\ p_n \end{pmatrix} + \Delta p_0,  \quad (14a)$$

$$|\Delta p_0| \le \overline{\Delta p_0}.  \quad (14b)$$

In this case, $p_t \in P_T$ denotes the settable reference powers and $p_n$ represents the (non-settable) reference powers. With $\Delta p_0 \Sigma \mathbb{R}^N$, corresponding unknown uncertainties, which are limited by the limit value $\overline{\Delta p_0} \in \mathbb{R}_+^N$, are taken into consideration. In this case, symmetrical intervals are assumed, wherein similar results can also be derived for non-symmetrical intervals. In accordance with the above consideration of uncertainties on the basis of equations (14a) and (14b), a maximum fluctuation is established for each parameter $p_t$ or $p_n$. Alternatively, the uncertainties can also be defined as follows, however:

$$p_0 = \begin{pmatrix} p_t \\ p_n \end{pmatrix} + \Delta p_0,  \quad (15a)$$

$$\sum_{i=1}^N \frac{1}{\overline{\Delta p_{i0}}} |\Delta p_{i0}| \le 1.  \quad (15b)$$

The difference consists in that the uncertainties according to equations (14a) and (14b) take into consideration the infinity norm, i.e. all of the elements of $\Delta p_0$ can simultaneously have the maximum fluctuation. Accordingly, in the consideration of the uncertainties according to equations (15a) and (15b), a weighted 1-norm is used as a basis, i.e. not all of the elements of $\Delta p_0$ can simultaneously have the respective maximum fluctuation. The 1-norm weightings $\overline{\Delta p_{i0}}$ are in this case known variables which limit the uncertainties. The second case is more realistic since, in general, not all fed powers or loads fluctuate simultaneously up to the maximum value.

The following uncertainty sets are defined:

$$P_U^\infty(\overline{\Delta p_o}) = \{\Delta p_0 \in \mathbb{R}^N : |\Delta p_0| \le \overline{\Delta p_o}\},  \quad (16)$$

$$P_U^1(\overline{\Delta p_0}) = \left\{\Delta p_0 \in \mathbb{R}^N : \sum_{i=1}^N \frac{1}{\overline{\Delta p_0}} |\Delta p_0| \le 1\right\}.  \quad (17)$$

For reasons of clarity, the argument $\overline{\Delta p_0}$ is omitted from $p_0^{\infty,1}$.

By rewriting the above equation (7) in vectorial form, the following is obtained:

$$\omega(k_\theta, p_0) = p_0 - \frac{1^T p_0}{1^T k_\theta} k_\theta.  \quad (18)$$

In order now to minimize $\gamma$, the infinity norm from equation (10) needs to be minimized. In this case, both B and L are not dependent on $k_\theta$ and $p_0$. That is to say that the optimization problem is as follows:

$$\min_{\substack{k_\theta \in K \\ p_t \in P_T}} \max_{\Delta p_0 \in P_U^{\infty,1}} \left\| B^T L^\dagger \left(p_0 - 1^T p_0 \frac{k_\theta}{1^T k_\theta}\right) \right\|_\infty.  \quad (19)$$

The minimization according to equation (19) guarantees that the choice of the settable parameters of the proportional controllers provides overall a stable electrical grid and increases the robustness in respect to load variations.

In addition, in the embodiment described here, a limit for the deviation of the line frequency in the steady state from the rated frequency is taken into consideration as boundary condition. Therefore, $|\Omega - \omega_0| \le \Delta\Omega$ is demanded, i.e. the following boundary condition applies:

$$\left|\frac{1^T p_0}{1^T k_\theta}\right| \le \Omega.  \quad (20)$$

The limit $\Delta\Omega$ enables the limitation of the primary control power of each node which feeds or draws power using the following restriction:

$$\Delta\Omega k_\theta \leq \Delta r \quad (21).$$

In this case, the variable $\Delta r \in \mathbb{R}_+^N$ is a vector which establishes the upper limit of the primary control power for each node. This boundary condition is also included in the solution of the optimization problem in accordance with the described embodiment. For the purpose of simpler notation, it is assumed that the primary control power is symmetrical about the value of the nominally fed or drawn power, i.e. each node can provide the same amount of positive and negative primary control power.

Furthermore, in the above cost function (19), the costs occurring for the fed power can be offset against the benefit of the drawn power at the rated frequency with the aid of an additional cost term $$c_p^T \begin{pmatrix} p_t \\ p_n \end{pmatrix}, \quad (22)$$

where $c_p$ is the vector of the costs and benefits $c_{pi}$. In this case, it generally applies that the costs $c_{pi}$ for one generator node i with $p_{i0}>0$ are positive, i.e. the generation costs $c_{pi}p_{i0}$ increase with increasing generation power. Likewise, the benefit $c_{pi}$ for a load node i with $p_{i0}<0$ is normally positive, i.e. total costs $c_p^T p_0$ decrease, if the load node can draw more power because, in this case, $c_{pi}p_{i0}<0$ holds true. Similarly to this, the costs for the primary control power provided as required can be taken into consideration by the cost term $$c_k^T k_\theta \quad (23).$$

The optimization is described below taking into consideration the terms (22) and (23), which in this case are part of the cost function (see equations (24a) and (25a)).

The optimization of the cost function (19) using (22) and (23) with the boundary conditions (13), (20) and (21) represents a compromise between inexpensive operation of the grid, stability of the electrical grid, deviation of the line frequency from the rated frequency and the limits for the reference and primary control power which can be provided.

As part of the solution to the optimization problem, the non-convex min-max problem in accordance with equations (19), (22), (23), (13), (20) and (21) is transformed into a convex optimization problem. For this purpose, first the normalized proportionality factors k are defined such that $\mu k_\theta = k$ holds true, where $$\mu = \frac{1}{1^T k_\theta} > 0$$

holds true, so that $1^T k = 1$. In addition, $\eta = 1^T p_0$ is defined. Thus, the above equation (20) can be rewritten to give $\mu|\eta| \leq \Delta\Omega$. Finally, the parameters $p_t$ are established such that $1^T p_t = -1^T p_n$ i.e. $\Omega = \omega_0$ if $\Delta p_0 = 0$ holds true.

Together with the above equations (14a), (14b) and (15a), (15b), the optimization problem can then be written as follows:

$$\min_{\substack{k>0 \\ \mu>0 \\ p_t \in P_T}} \left( \alpha c_p^T \begin{pmatrix} p_t \\ p_n \end{pmatrix} + \bar{\beta} c_k^T k_\theta + \right. \quad (24a)$$

$$\left. \max_{\Delta p_0 \in P_U^{\infty,1}} \left\| B^T L^\dagger \left( \begin{pmatrix} p_t \\ p_n \end{pmatrix} + \Delta p_0 - \eta^k \right) \right\|_\infty \right)$$

with the following boundary conditions:

$$1^T k = 1 \quad (24b),$$

$$1^T p_t = -1^T p_n \quad (24c),$$

$$1^T \Delta p_0 = \eta \quad (24d),$$

$$\mu|\eta| \leq \Delta\Omega \quad (24e),$$

$$\underline{p_t} \leq p_t \leq \overline{p_t} \quad (24f),$$

$$\Delta\Omega k \leq \mu \Delta r \quad (24g),$$

$$k_i = \mu k_{\theta i}^0, \forall i \in \overline{N_K} \quad (24h).$$

In this case, the constant weightings $\alpha$ and $\bar{\beta}$ reproduce the ratios between the various cost components.

The last boundary condition guarantees that those proportionality factors which cannot be set are established for the value $k_{\theta i}^0$. The optimization problem according to equations (24a) to (24h) is a min-max problem which requires further reformulation.

For the uncertainty in accordance with the above equations (14a) and (14b), $\eta \leq 1^T \overline{\Delta p_0}$ and $\eta = 1^T \overline{\Delta p_0}$ are obtained for the limit values. For the uncertainty according to the above equations (15a) and (15b), $\eta = 1^T \overline{\Delta p_0} \leq \max_i \overline{\Delta p_{i0}}$ and $\eta = \max_i \overline{\Delta p_{i0}}$ are obtained for the limit values. Thus, the equation (24e) can be replaced by $\mu 1^T \overline{\Delta p_0} \leq \Delta\Omega$ or $\mu \max_i \overline{\Delta p_{i0}} \leq \Delta\Omega$, depending on whether the uncertainties are considered according to equations (14a) and (14b) or according to equations (15a) and (15b). If $\eta$ in the above cost function (24a) is replaced using equation (24d), the boundary conditions are no longer relevant for the maximization, but only for the minimization. Thus, the maximization problem can be explicitly solved. For the uncertainties according to equations (14a) and (14b), the optimization problem in this case is as follows:

$$\min_{\substack{k>0 \\ \mu>0 \\ p_t \in P_T}} \left( \alpha c_p^T \begin{pmatrix} p_t \\ p_n \end{pmatrix} + \beta c_k^T k + \right. \quad (25a)$$

$$\left. \left\| B^T L^\dagger \begin{pmatrix} p_t \\ p_n \end{pmatrix} \right\| + |B^T L^\dagger (I - k 1^T)| \overline{\Delta p_0} \right\|_\infty \right)$$

with the boundary conditions:

$$1^T k = 1 \quad (25b),$$

$$1^T p_t = -1^T p_n \quad (25c),$$

$$\mu 1^T \overline{\Delta p_0} \leq \Delta\Omega \quad (25d),$$

$$\underline{p_t} \leq p_t \leq \overline{p_t} \quad (25e),$$

$$\Delta\Omega k \leq \mu \Delta r \quad (25f),$$

$$k_i = \mu k_{\theta i}^0, \forall i \in \overline{N_K} \quad (25g).$$

In this case, the weighting $\bar{\beta}$ in equation (24a) has been replaced by $\beta \approx \bar{\beta}/\mu$ in equation (25a) in order to obtain a cost function which is convex in the optimization variables.

For the uncertainties according to equations (15a) and (15b), the optimization problem can be written as follows:

$$\min_{\substack{k>0 \\ \mu>0 \\ p_t \in P_T}} \left( \alpha c_p^T \begin{pmatrix} p_t \\ p_n \end{pmatrix} + \beta c_k^T k + \right. \tag{26a}$$

$$\left. \left\| B^T L^\dagger \begin{pmatrix} p_t \\ p_n \end{pmatrix} \right\| + \| |B^T L^\dagger (I - k1^T)| \operatorname{diag}(\overline{\Delta p_0}) \|_{row,max} \|_\infty \right)$$

with the boundary conditions:

$$1^T k = 1 \tag{26b}$$

$$1^T p_t = -1^T p_n \tag{26c}$$

$$\mu \max_i \overline{p_{i0}} \leq \Delta \Omega \tag{26d}$$

$$\underline{p}_t \leq p_t \leq \overline{p}_t \tag{26e}$$

$$\Delta \Omega k \leq \mu \Delta r \tag{26f}$$

$$k_i = \mu k_{\theta i}^0, \forall i \in \overline{N_K} \tag{26g}$$

In this case, again the weighting $\overline{\beta}$ in equation (24a) has been replaced by $$\beta \approx \frac{\overline{\beta}}{\mu}$$

in equation (26a). In this case, $\|Q\|_{row,max}$ denotes the maximum norm of the rows in the matrix Q, i.e. the following holds true:

$$\left\| \begin{pmatrix} q_1^T \\ \vdots \\ q_n^T \end{pmatrix} \right\|_{row,max} = vec(\|q_i^T\|_\infty). \tag{27}$$

The above optimization problems are now convex and can thus be solved in a suitable manner with solution methods known per se such as, for example, the inner point method.

As an alternative embodiment to the optimization problems described in equations (25) and (26), individual terms of the sum of the cost function can also be formulated as boundary conditions. For example, the infinity norm, which minimizes the maximum phase difference of adjacent nodes, can be used as boundary condition in order to minimize the generation costs with the default that the maximum phase angle is less than a preset, fixed value.

The optimization described previously is performed in the electrical grid at predetermined time intervals, i.e. at determined time intervals values updated by the control unit CO for the parameters of the corresponding proportional controllers are given to the relevant nodes, i.e. an updated value of these parameters is set in the node. A criterion according to which updating of the parameters is implemented can be established, for example, by virtue of the fact that a deviation between the line frequency and the rated frequency exceeds a predetermined threshold.

In a further embodiment, in addition there is the possibility of the optimization problem being performed a plurality of times at a corresponding time for a decreasing deviation A between the line frequency and the rated frequency as boundary condition until the maximum phase value γ becomes too high, i.e. a predetermined threshold is exceeded. The corresponding values of the reference powers and proportionality factors prior to this threshold being exceeded are then used for setting the proportional controllers.

The embodiments of the method according to the invention described previously have a number of advantages. In particular, owing to the solution of an optimization problem, corresponding parameters of proportional controllers in an electrical grid are set in respect of cost efficiency, stability and robustness of the grid and a small difference between the line frequency and the rated frequency. In this case, in order to formulate the optimization problem, an analytical condition is used as a measure of the stability and robustness of the grid. In the method according to embodiments of the invention, suitable parameters for the proportional controllers in the electrical grid can be determined in real time by the solution of the optimization problem without a time-consuming recursive redesign and stability analysis needing to be performed on the basis of simulations of the electrical grid.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

LIST OF REFERENCES

[1] J. W. Simpson-Porco, F. Dörfler, and F. Bullo. Droop-Controlled Inverters are Kuramoto Oscillators. http://arxiv.org/pdf/1206.5033v1.pdf, 2012.
[2] A. Hoballah and I. Erlich. Dynamic Stability and Network Constrained Optimal Spinning Reserve Allocation. Proc. IEEE Power and Energy Soc. General Meeting, 2011, pages 1-5.
[3] Peter W. Sauer, M. A. Pai; Power System Dynamics and Stability; Stipes Publishing LLC, 2006, p. 206.
[4] F. Dörfler, M. Chertkov, and F. Bullo. Synchronization in Complex Oscillator Networks and Smart Grids. http://arxiv.org/pdf/1208.0045v1.pdf

The invention claimed is:

1. A method for computer-aided control of power in an electrical grid, wherein the electrical grid has a preset rated frequency and comprises a plurality of nodes, which are connected to one another via electrical lines and each feed power into the electrical grid or draw power from the electrical grid, wherein the power fed into or drawn from the respective nodes is given via a proportionality relationship, in accordance with which, in a preset frequency range of the voltages at the respective node, the power is set on the basis of a reference power, which is the drawn or fed power at the preset rated frequency, and on the basis of a proportionality factor depending on a difference between a frequency of the voltage in the respective node and the preset rated frequency of the electrical grid, wherein a proportional controller is provided in at least some of the nodes, for which the proportional controller, the reference power, and/or the proportionality factor is set, wherein:
   a) a steady state of the electrical grid is modeled in which a constant frequency is set for all of the voltages of the nodes;
   b) an optimization problem is solved and hereby reference powers and proportionality factors are determined for at least some of the proportional controllers, wherein the optimization problem is defined on a basis of a condition for the modeled steady state, wherein when the condition is met, the phase differences between the voltages of adjacent nodes are each less than or less than or equal to a maximum phase value; and c) the at least some of the proportional controllers are set to the reference powers and proportionality factors determined in step b);

further wherein the optimization problem is converted into a convex optimization problem.

2. The method as claimed in claim 1, wherein the proportionality relationship in the respective nodes is as follows:

$$\tilde{p}_i = \tilde{p}_{i0} - k_{\theta i}(\dot{\tilde{\theta}}_i - \omega_0),$$

wherein $\tilde{p}_i$ is the power fed or drawn by a respective node i;

wherein $\tilde{p}_{i0}$ is the sum of the reference power $p_{i0}$ and the local load $p_{iL}$ in the node i;

wherein $k_{\theta i}$ is the proportionality factor in the node i;

wherein $\dot{\tilde{\theta}}_i$ is the frequency of the voltage of the node i;

wherein $\omega_0$ is the rated frequency of the electrical grid.

3. The method as claimed in claim 1, wherein the steady state of the electrical grid is modeled on the basis of a dynamic physical model, wherein the dynamic physical model describes the time profile of the phases of the voltages in the respective nodes as a function of parameters of the electrical grid comprising the reference powers and proportionality factors of the proportionality relationships.

4. The method as claimed in claim 3, wherein the dynamic physical model comprises a system of coupled differential equations, wherein a respective differential equation represents the time profile of the phase of the voltage of a node.

5. The method as claimed in claim 4, wherein the system of coupled differential equations represents a physical oscillation equation system.

6. The method as claimed in claim 5, wherein the oscillation equation system is as follows:

$$M_i \ddot{\tilde{\theta}}_i + k_{\theta i} \dot{\tilde{\theta}}_i = k_{\theta i}\omega_0 + \tilde{p}_{i0} - p_{iL} - \sum_{j \in N_i} b_{ij} u_i u_j \sin(\tilde{\theta}_i - \tilde{\theta}_j),$$

where $M_i$ is the moment of inertia of a mass coupled to the electrical grid in the respective node i;

where $\ddot{\tilde{\theta}}_i$ is the derivative of the frequency of the voltage in the respective node i;

where $\tilde{\theta}_i$ and $\tilde{\theta}_j$ are the phase of the voltage in the respective node i and j, respectively;

where $N_i$ represents the amount of nodes adjacent to a respective node i;

where $u_i$ and $u_j$ are the rms values of the voltages in the respective nodes i and j, respectively;

where $b_{ij}$ is the susceptance of the electrical line between nodes i and j.

7. The method as claimed in claim 1, wherein the steady state of the electrical grid is modeled on a basis of load flow equations for the real powers generated in the respective nodes.

8. The method as claimed in claim 7, wherein the condition whereby the ohmic resistance on the electrical lines between adjacent nodes in the electrical grid is negligibly low in comparison with the reactance on the electrical lines between adjacent nodes is taken into consideration in the load flow equations.

9. The method as claimed in claim 7, wherein the load flow equation for a respective node i is as follows:

$$P_i = \sum_{j \in N_i} \left[ u_i^2 \frac{r_{ij}}{r_{ij}^2 + x_{ij}^2} - \frac{u_i u_j}{r_{ij}^2 + x_{ij}^2} \left( r_{ij}\cos(\tilde{\theta}_j - \tilde{\theta}_i) + x_{ij}\sin(\tilde{\theta}_j - \tilde{\theta}_i) \right) \right],$$

where $P_i$ is the real power generated at the node i;

where $\tilde{\theta}_i$ and $\tilde{\theta}_j$ are the phase of the voltage in the respective nodes i and j;

where $N_i$ represents the amount of nodes adjacent to a respective node i;

where $u_i$ and $u_j$ are the rms values of the voltages in the respective nodes i and j;

where $r_{ij}$ is the ohmic resistance and $x_{ij}$ is the reactance of the electrical line between nodes i and j.

10. The method as claimed in claim 1, wherein the condition for the modeled steady state is as follows:

$$\|B^T L^\dagger \omega\|_\infty \leq \sin(\gamma) \quad \gamma \in \left[0, \frac{\pi}{2}\right],$$

where $L^\dagger$ is the pseudo-inverse of the matrix $L = B\,\mathrm{diag}(a_{ij})B^T$, where $a_{ij} = b_{ij} u_i u_j$;

where $u_i$ and $u_j$ are the rms values of the voltages in the respective nodes i and j;

where $b_{ij}$ is the susceptance of the electrical line between nodes i and j;

where $B^T$ is the incidence matrix of the topology of the electrical grid;

where $\omega = \mathrm{vec}(\omega_i)$, where $$\omega_i = p_{i0} - k_{\theta i} \frac{\sum_{i=0}^{N} p_{i0}}{\sum_{i=0}^{N} k_{\theta i}},$$

and N represents the number of the nodes in the electrical grid;

where $\gamma$ represents the maximum phase value, where the optimization problem is the minimization of $\|B^T L^\dagger \omega\|_\infty$ as a function of the reference powers (P10, P20, ..., P50) and proportionality factors (k1, k2, k5) of the at least some of the proportional controllers.

11. The method as claimed in claim 1, wherein, during the solution of the optimization problem, it is considered, as boundary condition, that the reference powers of at least some of the proportional controllers are within a predetermined interval.

12. The method as claimed in claim 1, wherein, during the solution of the optimization problem, it is considered, as boundary condition, that the reference powers of the proportionality relationships of all of the nodes fluctuate within a predetermined fluctuation degree.

13. The method as claimed in claim 12, wherein the fluctuation degree is defined in such a way that the fluctuation in the reference power of the proportionality relationship of each node is less than or less than or equal to a predetermined value.

14. The method as claimed in claim 1, wherein the fluctuation degree is defined in such a way that a sum and in particular a weighted sum of the fluctuations in the reference powers of the proportionality relationships of all of the nodes is less than or less than or equal to a predetermined value.

15. The method as claimed in claim 1, wherein, during the solution of the optimization problem, it is considered, as boundary condition, that the line frequency set in the steady state in the electrical grid deviates from the rated frequency of the electrical grid by less than a predetermined frequency value.

16. The method as claimed in claim 15, wherein at least some of the nodes have available primary control power for the electrical grid, wherein, from the boundary condition whereby the line frequency set in the steady state in the electrical grid deviates from the rated frequency by less than a predetermined frequency value, a further boundary condition is derived which is taken into consideration in the solution of the optimization problem and in accordance with which the respective primary control powers are less than or less than or equal to a predetermined threshold value.

17. The method as claimed in claim 15, wherein step b) is implemented a number of times for ever decreasing predetermined frequency values until the minimized maximum value resulting in step b) from the solution of the optimization problem exceeds a predetermined threshold, wherein the at least some of the proportional controllers is set to the reference powers and proportionality factors which result from step b) directly prior to the predetermined threshold being exceeded.

18. The method as claimed in claim 1, wherein the optimization problem describes the minimization of a cost function, which is greater than the maximum phase value.

19. The method as claimed in claim 18, wherein the cost function comprises, as single team, the maximum phase value, or in that the cost function comprises a sum of a term of the maximum phase value and one or more further terms, wherein the further term(s) is/are preferably configured in such a way that at least one of the further terms is greater than the power fed by the nodes and/or the lower the power drawn by the nodes and/or the greater the primary control power that the nodes have available.

20. The method as claimed in claim 1, wherein the optimization problem describes the minimization of a cost function which is independent of the maximum phase value, wherein, as boundary condition of the optimization problem, it is considered that the maximum phase value is less than a preset threshold value.

21. An apparatus for computer-aided control of power in an electrical grid, wherein the electrical grid has a preset rated frequency and comprises a plurality of nodes, which are connected to one another via electrical lines and which each feed power into the electrical grid or draw power from the electrical grid, wherein the power fed in or drawn by the respective nodes is given via a proportionality relationship, in accordance with which, in a preset frequency range of the voltages in the respective node, the power is set on the basis of a reference power, which is the drawn or fed power at rated frequency, and a proportionality factor depending on a difference between the frequency of the voltage in the respective node and the preset rated frequency of the electrical grid, wherein a proportional controller is provided in at least some of the nodes, for which the proportional controller the reference power and/or the proportionality factor is set, wherein the apparatus is designed for implementing a method in which:
  a) a steady state of the electrical grid is modeled in which a constant frequency is set for all of the voltages of the nodes;
  b) an optimization problem is solved and hereby reference powers and proportionality factors are determined for at least some of the proportional controllers, wherein the optimization problem is defined on the basis of a condition for the modeled steady state, wherein when said condition is met, the phase differences between the voltages of adjacent nodes are each less than or less than or equal to a maximum phase value;
  c) the at least some of the proportional controllers are set to the reference powers and proportionality factors determined in step b);
  wherein the optimization problem is converted into a convex optimization problem.

22. An electrical grid, which has a preset rated frequency and comprises a plurality of nodes, which are connected to one another via electrical lines and which each feed power into the electrical grid or draw power from the electrical grid during operation, wherein the power fed or drawn by the respective nodes is given via a proportionality relationship, in accordance with which, in a preset frequency range of the voltages in the respective node, the power is set on the basis of a reference power, which is the drawn or fed power at the rated frequency, and a proportionality factor ($k_1$, in dependence on a difference between the frequency of the voltage in the respective node and the preset rated frequency of the electrical grid, wherein a proportional controller is provided in at least some of the nodes, for which the proportional controller the reference power and/or the proportionality factor is set, wherein the electrical grid comprises an apparatus for computer-aided control of the generated power as claimed in claim 21.

* * * * *

UNITED STATES PATENT AND TRADEMARK OFFICE
CERTIFICATE OF CORRECTION

PATENT NO. : 9,948,103 B2
APPLICATION NO. : 14/442421
DATED : April 17, 2018
INVENTOR(S) : Chris Oliver Heyde et al.

It is certified that error appears in the above-identified patent and that said Letters Patent is hereby corrected as shown below:

In the Claims

Line 45, Column 18, Claim 10 delete "(k1, k2, k5)" and insert -- (k1, k2, . . . , k5) --

Signed and Sealed this
Fourteenth Day of August, 2018

Andrei Iancu
*Director of the United States Patent and Trademark Office*